United States Patent
Shrestha et al.

(10) Patent No.: US 11,347,305 B1
(45) Date of Patent: May 31, 2022

(54) MANAGING SOFTWARE FILES OF A DATA CENTER VIA AUGMENTED REALITY

(71) Applicant: Dell Products L.P., Round Rock, TX (US)

(72) Inventors: Saurav Shrestha, Round Rock, TX (US); Jeffrey M. Lairsey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/191,031

(22) Filed: Mar. 3, 2021

(51) Int. Cl.
*G06F 3/0486* (2013.01)
*G06F 3/01* (2006.01)
*G06F 8/60* (2018.01)
*G06F 16/21* (2019.01)

(52) U.S. Cl.
CPC .............. *G06F 3/011* (2013.01); *G06F 3/017* (2013.01); *G06F 3/0486* (2013.01); *G06F 8/60* (2013.01); *G06F 16/21* (2019.01)

(58) Field of Classification Search
CPC ..................................................... G06F 3/011
USPC ......................................................... 715/863
See application file for complete search history.

(56) References Cited

U.S. PATENT DOCUMENTS

| | | | | |
|---|---|---|---|---|
| 11,074,730 B1 * | 7/2021 | Nunez | ................ | G05B 23/0272 |
| 2010/0313145 A1 * | 12/2010 | Dillenberger | .......... | G06Q 10/06 709/204 |
| 2011/0258143 A1 * | 10/2011 | Hilkemeyer | ........... | G06Q 40/00 705/400 |
| 2012/0249588 A1 * | 10/2012 | Tison | ..................... | G06V 20/20 382/103 |
| 2013/0031202 A1 * | 1/2013 | Mick | ......................... | G06F 3/00 709/217 |
| 2014/0006762 A1 * | 1/2014 | Bittner | ................ | G06F 9/44505 713/1 |
| 2017/0091607 A1 * | 3/2017 | Emeis | ...................... | G06T 11/00 |
| 2017/0269617 A1 * | 9/2017 | Daoud | .................... | G06F 3/011 |
| 2019/0236844 A1 * | 8/2019 | Balasian | ............... | G06T 19/006 |
| 2020/0117529 A1 * | 4/2020 | Qiao | ....................... | G06N 7/005 |
| 2020/0117898 A1 * | 4/2020 | Tian | .................... | G06F 3/04815 |
| 2020/0167712 A1 * | 5/2020 | Stracquatanio | ......... | G06F 3/012 |
| 2020/0250430 A1 * | 8/2020 | Kishore | .................. | H04L 41/12 |
| 2020/0250863 A1 * | 8/2020 | Shetty | ...................... | H04Q 1/16 |
| 2020/0252276 A1 * | 8/2020 | Lairsey | ............... | H04L 41/0813 |
| 2020/0253079 A1 * | 8/2020 | Lairsey | ................. | G06T 19/006 |
| 2020/0329214 A1 * | 10/2020 | Ahn | ........................ | G06F 3/017 |
| 2021/0084119 A1 * | 3/2021 | Sheikh | .................. | G06T 19/006 |
| 2021/0112145 A1 * | 4/2021 | Monga | ................. | G06K 9/6288 |
| 2021/0397182 A1 * | 12/2021 | Dundorf | .............. | G05D 1/0038 |

* cited by examiner

*Primary Examiner* — Reza Nabi
(74) *Attorney, Agent, or Firm* — Terrile, Cannatti & Chambers; Stephen A. Terrile (57) ABSTRACT

A system, method, and computer-readable medium for performing a data center monitoring and management operation. The data center monitoring and management operation includes: identifying a data center management task; constructing a software file to address the data center management task, the software file being constructed via an augmented reality system; virtually providing an indication to install the software file via the augmented reality system; and, initiating installation of the software file within the data center via the augmented reality system.

11 Claims, 5 Drawing Sheets

MANAGING SOFTWARE FILES OF A DATA CENTER VIA AUGMENTED REALITY

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: identifying a data center management task; constructing a software file to address the data center management task, the software file being constructed via an augmented reality system; virtually providing an indication to install the software file via the augmented reality system; and, initiating installation of the software file within the data center via the augmented reality system.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a data center management task; constructing a software file to address the data center management task, the software file being constructed via an augmented reality system; virtually providing an indication to install the software file via the augmented reality system; and, initiating installation of the software file within the data center via the augmented reality system.

In another embodiment the invention relates to a computer-readable storage medium embodying computer program code, the computer program code comprising computer executable instructions configured for: identifying a data center management task; constructing a software file to address the data center management task, the software file being constructed via an augmented reality system; virtually providing an indication to install the software file via the augmented reality system; and, initiating installation of the software file within the data center via the augmented reality system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Various aspects of the invention reflect an appreciation that data center system administrators, beyond their day-to-day monitoring and management duties, often have the additional responsibility of procuring, deploying, configuring, implementing, maintaining, and remediating certain data center assets. Certain aspects of the invention likewise reflect an appreciation that the complexity of such additional responsibilities generally grows in proportion to the number of data center assets that are being monitored and managed. Likewise, certain aspects of the invention reflect an appreciation that the more quickly individual data center assets can be procured, deployed, configured, implemented, maintained, and remediated will likely lead to higher quality of service levels and user satisfaction.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
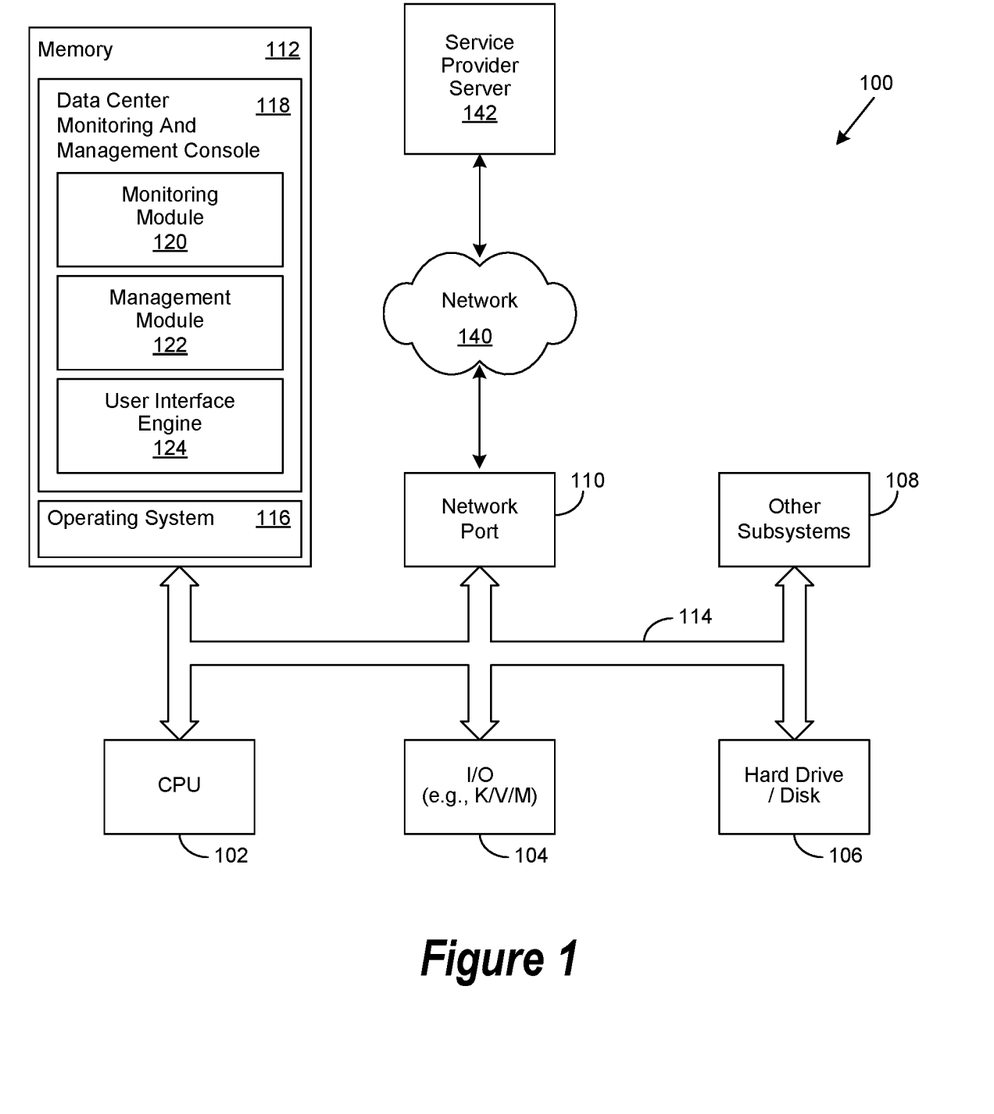
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
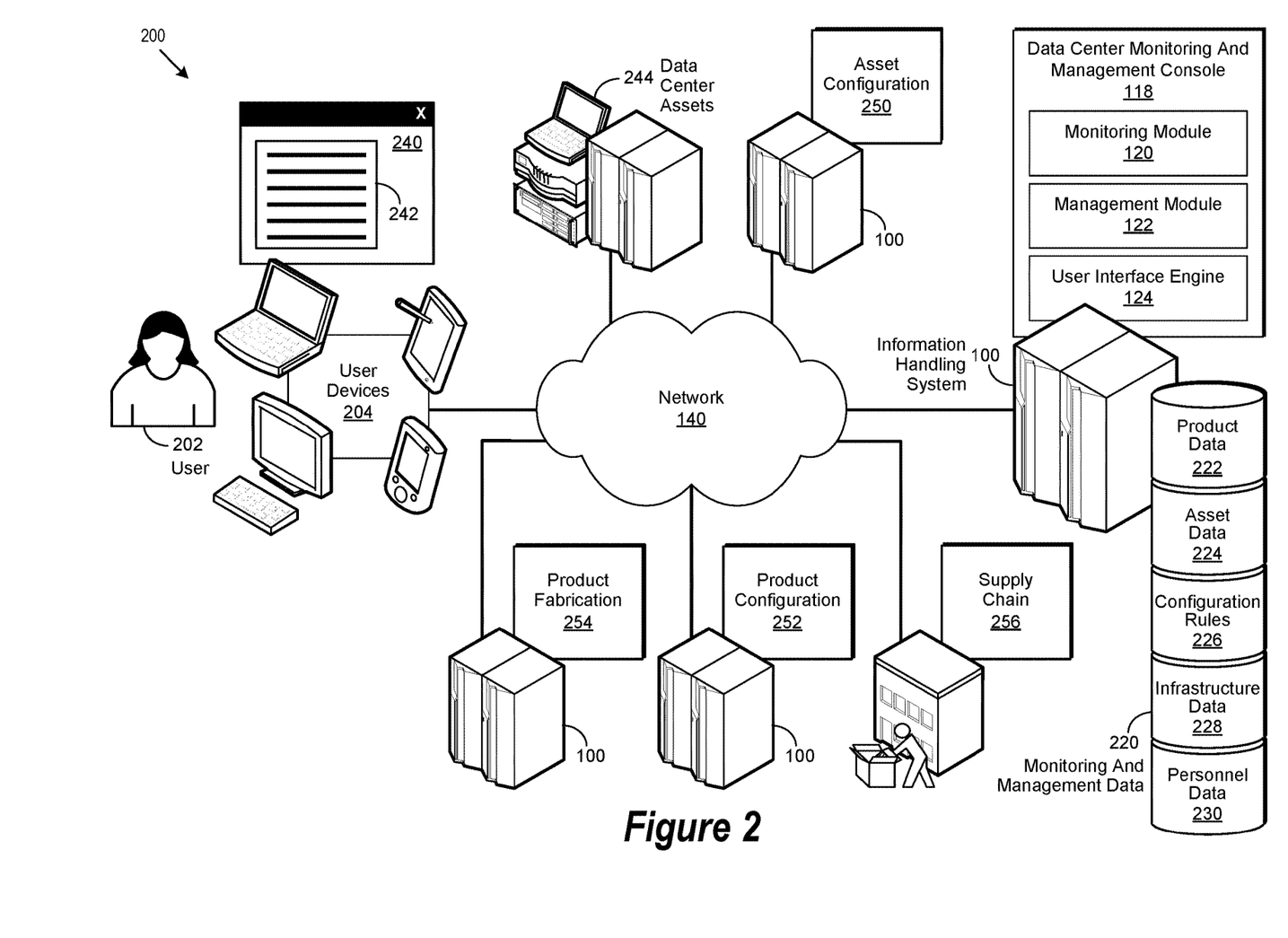
FIG. 2 shows a block diagram of a data center system monitoring and management environment.

FIG. 2 is a block diagram of a data center monitoring and management environment implemented in accordance with an embodiment of the invention. As used herein, a data center broadly refers to a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, operation, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment task, a data center remediation task, or a combination of the two. As used herein, a data center deployment task broadly refers to any function, operation, procedure, or process performed, directly or indirectly, within a data center monitoring and management environment 200 to install a software file, such as a configuration file, a new software application, a version of an operating system, and so forth, on a data center asset 244. As likewise used herein, a data center remediation task broadly refers to any function, operation, procedure, or process performed, directly or indirectly, within a data center monitoring and management environment 200 to correct an operational situation associated with a particular data center asset 244 that may result in negative consequences.

In certain embodiments, the data center monitoring and management environment 200 may be implemented to include a data center monitoring and management console 118, an asset configuration system 250, a product configuration system 252, a product fabrication system 254, and a supply chain system 256, or a combination thereof. In certain embodiments, the data center monitoring and management console 118 may be implemented to include a monitoring module 120, a management monitor 122, and a user interface (UI) engine 124, or a combination thereof.

In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244, at any point in its lifecycle. In various embodiments, the UI engine 124 may be implemented to generate a UI for the provision, or receipt, of certain information associated with the monitoring, or management, of a particular data center asset 244.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with product data 222, data center asset data 224, data center asset configuration rules 226, data center infrastructure data 228, and data center personnel data 230.

As used herein, product data 222 broadly refers to information associated with a product, such as an information handling system 100, which can be read, measured, and structured into a usable format. For example, product data 222 associated with a particular server may include the number and type of processors it can support, their speed and architecture, minimum and maximum amounts of memory supported, various storage configurations, the number, type, and speed of input/output channels and ports, and so forth. In various embodiments, the product data 222 may likewise include certain performance and configuration information associated with a particular workload, as described in greater detail herein. In various embodiments, the product data 222 may include certain public or proprietary information related to data center asset 244 configurations associated with a particular workload.

As used herein, data center asset data 224 broadly refers to any information associated with a data center asset 244, described in greater detail herein. In certain embodiments, the data center asset data 224 may include information associated with data center asset 244 types, quantities, locations, use types, optimization types, workloads, performance, support information, and cost factors, or a combination thereof, as described in greater detail herein. In certain embodiments, the data center asset data 224 may include information associated with data center asset 244 utilization patterns, likewise described in greater detail herein.

As likewise used herein, a data center asset configuration rule 226 broadly refers to a rule used to configure a particular data center asset 244. In certain embodiments, one or more data center asset configuration rules 226 may be used to verify that a particular data center asset 244 configuration is the most optimal for an associated location, or workload, or a combination of the two, as described in greater detail herein. In certain embodiments, the data center asset configuration rule 226 may be used in the performance of a data center asset configuration verification operation. In certain embodiments, the data center asset verification operation may be performed by an asset configuration system 250.

As used herein, data center infrastructure 228 data broadly refers to any data associated with a data center infrastructure component. As likewise used herein, a data center infrastructure component broadly refers to any component of a data center asset environment 224 that may be involved, directly or indirectly, in the procurement, deployment, implementation, configuration, operation, monitoring, management, maintenance, or remediation of a particular data center asset 244. Examples of data center infrastructure components include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. Other examples of data center infrastructure components include the provision of certain services, such as network connectivity, conditioned airflow, electrical power, and water, or a combination thereof.

Data center personnel data 230, as used herein, broadly refers to any data associated with personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain personnel. In various embodiments, the data center personnel data 230 may likewise include education, certification, and skill level information corresponding to certain personnel. Likewise, in various embodiments, the data center personnel data 230 may include security-related information, such as security clearances, user IDs, passwords, security-related biometrics, authorizations, and so forth, corresponding to certain personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center asset management environment 200 may have certain interdependencies. As an example, a data center asset management environment 200 may have multiple servers interconnected by a storage area network (SAN) providing block-level access to various disk arrays and tape libraries. In this example, the servers, various physical and operational elements of the SAN, as well as the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center asset management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules. In certain of these embodiments, the data center asset configuration rules may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center asset management console 118. In certain embodiments, the UI engine 124 may be implemented to generate the data center monitoring and management console UI 240, or the graphical representation 242 presented therein, or both.

In certain embodiments, the user device 204 may be used to exchange information between the user 202 and the data center monitoring and management console 118, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the data center asset management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center asset management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
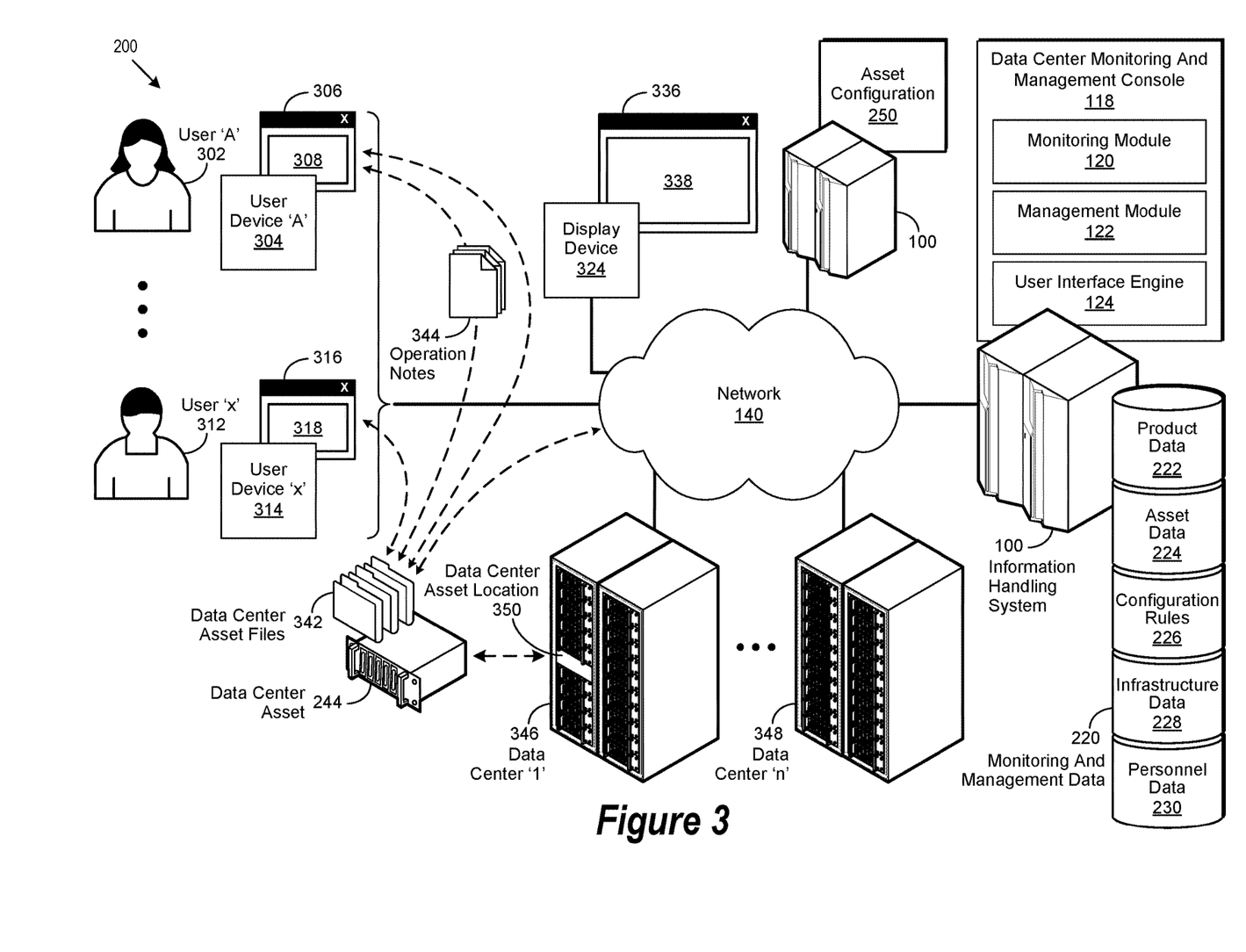
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In certain embodiments, users 'A' 302 through 'x' 312 may respectively interact with the data center monitoring and management console 118, and other components of the data center monitoring and management environment 200, through the use of an associated user device 'A' 304 through 'x' 314. In certain embodiments, such interactions may be respectively presented to users 'A' 302 through 'x' 312 within a user interface (UI) window 306 through 316, corresponding to user devices 'A' 304 through 'x' 314.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the data center monitoring and management operation may be performed to identify the location 350 of a particular data center asset 344. In certain embodiments, the location 350 of a data center asset 344 may be physical, such as the physical address of its associated data center, a particular room in a building at the physical address, a particular location in an equipment rack in that room, and so forth. In certain embodiments, the location 350 of a data center asset 344 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention likewise reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center technician may be responsible for remediating hardware issues, such as replacing a disc drive in a server or Redundant Array of Independent Disks (RAID) array, or software issues, such as updating the OS version on a server. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center augmented reality operation. Those of skill in the art will be familiar with the concept of augmented reality (AR), which as typically used, refers to an interactive experience of a real-world environment where the objects that reside in the real world are enhanced by computer-generated perceptual information, sometimes across multiple sensory modalities, including visual, auditory, and haptic. In general, AR can be defined as a system that fulfills three basic features: a combination of real and virtual worlds, real-time interaction, and accurate 3D registration of virtual and real objects. In certain implementations, the overlaid AR sensory information may be constructive, which is additive to the natural environment, or destructive, which may mask certain aspects of the natural environment.

Accordingly, as used herein, a data center AR operation broadly refers to any data center monitoring and management operation performed in an augmented reality mode. As likewise used herein, an AR mode broadly refers to a mode of operation where physical components and aspects of the data center monitoring and management environment 200 are seamlessly interwoven with their respective graphical representations 308 through 318, and 338. In certain embodiments, such graphical representations 308 through 318, and 338 may be respectively presented within a corresponding UI window 306 through 316, and 336. In certain embodiments, performance of a data center AR operation may facilitate the performance of a data center management task, described in greater detail herein.

In certain embodiments, a data center AR operation may be performed to visualize a particular data asset location 350 in a particular data center '1' 346 through 'n' 348 for deployment of a new, or replacement, data center asset 244. In certain embodiments, the data center AR operation may be performed to ensure that a particular data center asset location 350 in a particular data center '1' 346 through 'n' 348 is available for the deployment of the new, or replacement, data center asset 244. In various embodiments, the data center AR operation may be performed to identify and visualize certain data center asset files 342 associated with the particular data center asset 244. In certain embodiments, such visualizations may be respectively provided in a data center asset monitoring and management system UI window 306 through 316, or 366, associated with a particular user device 304 through 314, or a display device 324, as described in greater detail herein. In certain embodiments, the data center asset monitoring and management system UI window 306 through 316, or 366, may be implemented to allow the data center asset files 342 to be installed on its associated data center asset 244 through a user gesture, such as a drag and drop operation familiar to skilled practitioners of the art.

In various embodiments, graphical representations 308 through 318, or 338, of certain data center assets 244 may respectively be presented to user 'A' 302 through 'x' 312 within a UI window 306 through 316, or 336, of the data center monitoring and management console 118. In various embodiments, a data center AR operation may be initiated by a data center system administrator, such as user 'A' 302, selecting a graphical representation of target data center asset 244 within an associated UI window 306, 336. In certain embodiments, the data center system administrator may select a graphical representation 308, 338 of the target data center asset 244 through a user gesture familiar to skilled practitioners of the art, such as a mouse click, a finger tap, a drag and drop operation, and so forth.

Once the data center system administrator selects the representation of the target data center asset 244, they may then retrieve data center asset files 342 associated with the target data center asset 244. In certain embodiments, the retrieved data center asset files 342 may be stored in the repository of data center asset data 224. In certain embodiments, the data center asset files 342 associated with the target data center asset 244 may be presented to the data center system administrator within the UI window 306, 336 in the form of a graphical representation 308, 338. In certain embodiments, the data center system administrator may select the graphical representation of the data center asset files 342 through a user gesture, described in greater detail herein.

In certain embodiments, two or more retrieved data center asset files 342 may be combined with one another to generate a set of related data center asset files 342. In certain embodiments, one or more of the retrieved data center asset files 342 may be used by the data center system administrator to generate one or more additional data center asset files 342. In certain embodiments, the resulting additional data center asset files 342 may be combined with the previously retrieved data center asset files 342 to generate a set of related data center asset files 342. In certain embodiments, the previously-retrieved, or newly-generated, or combined set of related data center asset files 342, or a combination thereof, may be respectively presented in the form of a graphical representation 308, 338 within the UI window 306, 336. In certain embodiments, the previously-retrieved, or newly-generated, or combined set of related data center asset files 342, or a combination thereof, may then be associated with the target data center asset 244. In certain embodiments, the data center system administrator may associate the data center asset files 342 with the target data center asset 244 through a user gesture, such as a drag and drop operation, where a graphical representation of the data center asset files 342 are placed on top of a graphical representation of the target data asset 244.

In certain embodiments, the data center system administrator may generate certain data center monitoring and management operation notes 344. For example, the data center system administrator may enter certain data center asset 244 installation or configuration instructions in the data center monitoring and management operation notes 344. In certain embodiments, the resulting data center monitoring and management operation notes 344 may then be associated with the target data center asset 244 and its corresponding data center asset files 342. In certain embodiments, the data center system administrator may perform such an association through a user gesture, such as a drag and drop operation, where a graphical representation of the data center monitoring and management operation notes 344 are placed on top of a graphical representation of the target data asset 244.

In certain embodiments, the data center system administrator may then generate a corresponding data center monitoring and management operation work order (not shown) for the target data center asset 244. In certain embodiments, the resulting data center monitoring and management operation work order may then be assigned to a particular data center technician, such as user 'x' 312, for execution. In certain embodiments, the data center monitoring and management operation work order may be presented to the data center technician as a graphical representation 318 within a UI window 316 associated with a corresponding user device 314. In certain embodiments, the data center monitoring and management operation work order may be implemented such that it is only visible to the data center technician to which it is assigned.

In certain embodiments, the data center technician may then receive data center monitoring and management operation work order and accesses the data center monitoring and management console 118 in AR mode. Once in AR mode, the data center technician identifies a graphical representation 318 of the data center asset 244 associated with the data center monitoring and management operation work order they have received. In certain embodiments, the data center technician may then determine the location 350 of the data center asset 244 by interacting with its graphical representation 318 within a UI window 316 of the data center monitoring and management console 118. In certain embodiments, the interaction may be a user gesture, such as a mouse click, finger tap, and so forth. In certain embodiments, the data center asset location 350 may be associated with a particular equipment rack and slot within the data center.

In certain embodiments, once the location 350 of the data center asset 244 has been determined, the data center technician may access the data center monitoring and management operation notes 344 associated with the data center asset 244 and read them. In certain embodiments, the data center technician may then retrieve the data center asset files 342 associated with the data center asset. In certain embodiments, the data center technician may use the data center monitoring and management operation notes 344 as a reference in the performance of an associated data center monitoring and management operation.

For example, the data center monitoring and management operation notes 344 may include instructions on how a new server should be installed in a server, as well as which configuration files should be applied to the server and how the procedure to follow when applying the files. In certain embodiments, the data center technician may access the data center monitoring and management operation notes 344, or retrieve the data center asset files 342, associated with the data center asset 244 by interacting with its graphical representation 318 within a UI window 316 of the data center monitoring and management console 118. In certain embodiments, the interaction may be a user gesture, such as a mouse click, finger tap, and so forth.

In various embodiments, the data center technician may apply certain data center asset files 342 to the data center asset 244 through a user gesture, such as a drag and drop operation, where a graphical representation of the data center asset files 342 are placed on top of a graphical representation of the target data asset 244. In certain embodiments, the performance of such a user gesture may result in the initiation of one or more processes associated with applying the data center asset files 342 to the data center asset 244. Certain embodiments of the invention reflect an appreciation that the performance of such a data center AR operation may reduce the chance of errors, such as applying the wrong set of data center asset files 342 to the data center asset 244. In certain embodiments, the data center technician may then update the data center monitoring and management operation notes 344 to reflect the individual operations they may have performed, issues that may have arisen during the performance of those operations, and the operational status of the data center asset 342 once the operations have been completed, or a combination thereof.

Figure 4:
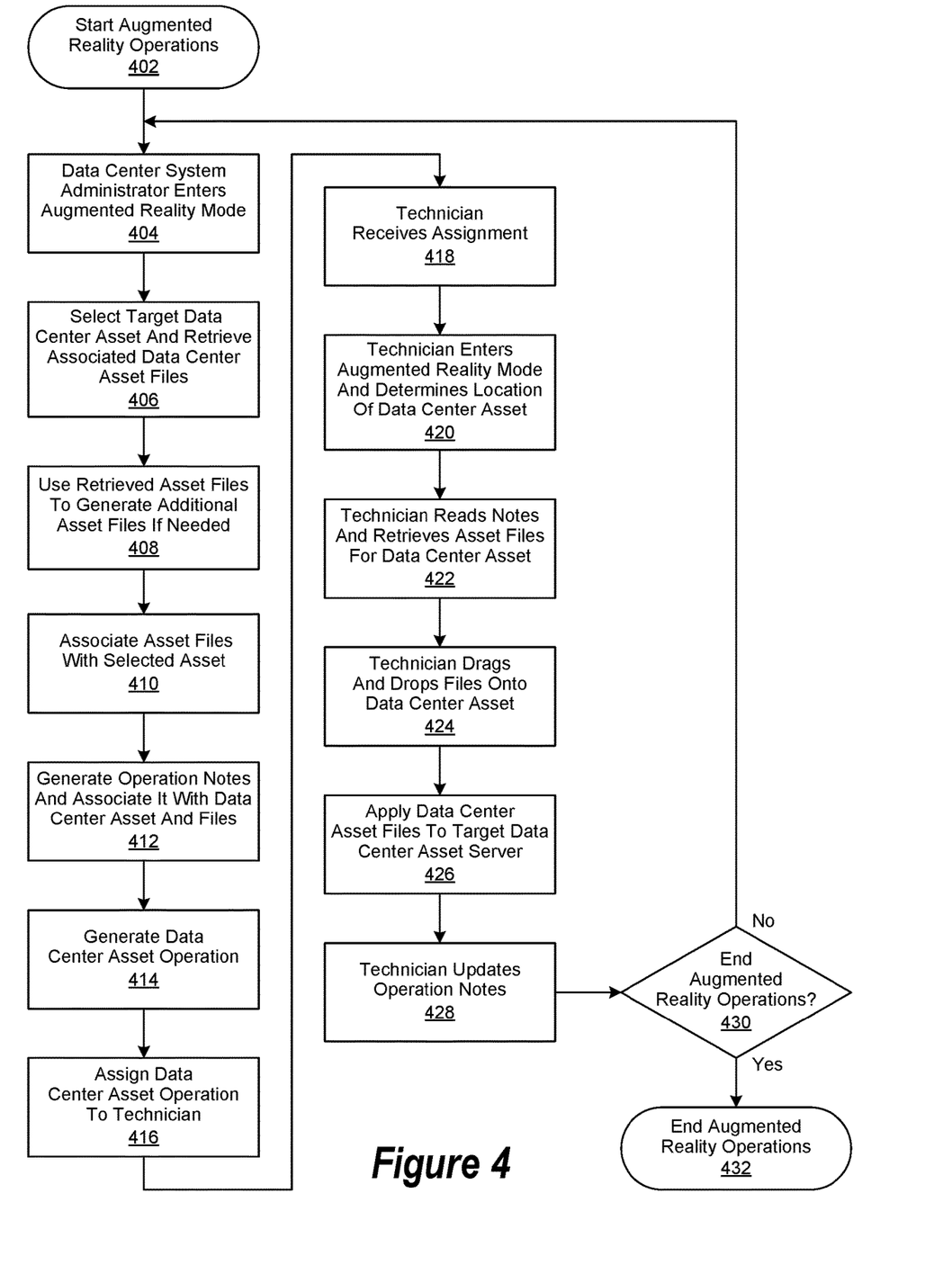
FIG. 4 shows a flowchart of the performance of data center augmented reality (AR) operations.

FIG. 4 shows a flowchart of the performance of data center augmented reality (AR) operations implemented in accordance with an embodiment of the invention. In this embodiment, performance of data center AR operations are begun in step 402, followed by a data center system administrator accessing a data center monitoring and management console and entering AR mode, as described in greater detail herein. The data center system administrator then selects a target data center asset and retrieves its associated data center asset files in step 404, as likewise described in greater detail herein. The data center system administrator then retrieves data center asset files associated with the target data center asset in step 406, likewise as described in greater detail herein. The retrieved data center asset files are then used by the data center system administrator in step 408 to generate any additional data center asset files that may be needed.

Thereafter, in step 410, the data center system administrator and associates the data center asset files with the target data center asset, as described in greater detail herein. Then, in step 412, the data center system administrator generates data center monitoring and management operation notes, which are in turn associated with the target data asset and the data center asset files, as likewise described in greater detail herein. The data center system administrator then generates a corresponding data center monitoring and management operation for the target data center asset in step 414, which is then assigned in step 416 to a data center technician for execution.

The data center technician then receives the assignment in step 418 and enters augmented reality mode, as described in greater detail herein, followed by determining the location of the target data asset, as likewise described in greater detail herein, in step 420. Once the location of the target data asset has been determined, the data center technician reads the data center monitoring and management operation notes associated with the target data center asset, and as described in greater detail herein, retrieves its associated data center asset files in step 422. Once the data center asset files have been retrieved, the data center technician drags and drops them on the target data center asset in step 424.

As a result, the data center asset files are applied to the target data center asset in step 426, and the data center technician updates the data center monitoring and management operation notes in step 428. A determination is then made in step 430 whether to end augmented reality data center asset monitoring and management operations. If not, then the process is continued, proceeding with step 404. Otherwise, augmented reality data center asset monitoring and management operations are ended in step 432.

Figure 5:
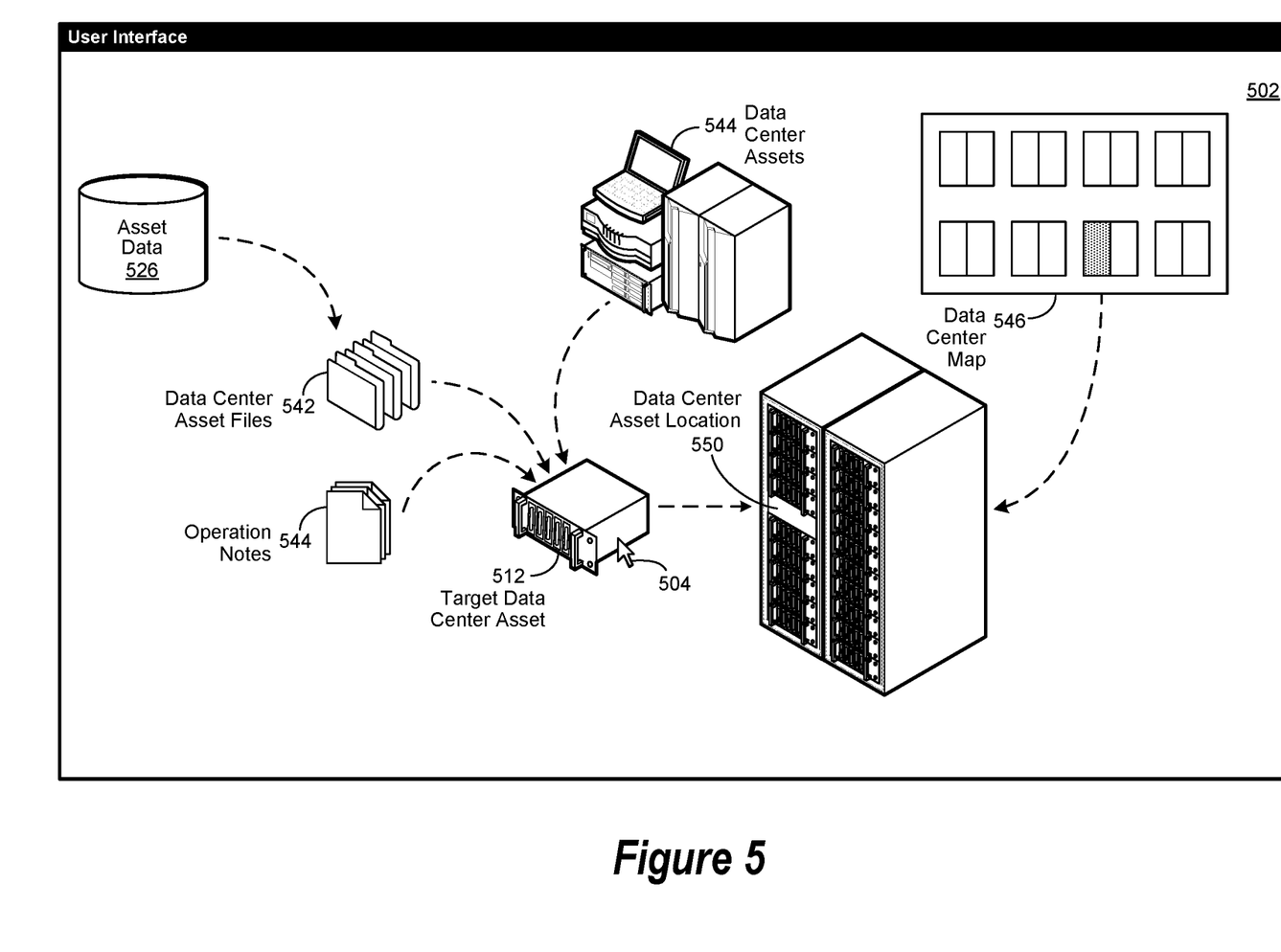
FIG. 5 shows an example screen presentation of a data center monitoring and management console user interface (UI).

FIG. 5 shows an example screen presentation of a data center monitoring and management console user interface (UI) implemented in an embodiment to the invention. In various embodiments, graphical representations of certain components of a data center monitoring and management environment, described in greater detail herein, may be presented within an associated user interface (UI) window 502. In various embodiments, as likewise described in greater detail herein, these graphical representations may be used in the performance of cert data center AR operations.

In certain embodiments, a data center AR operation may be performed to visualize a particular data center asset location 550. In certain embodiments, the data center asset location 550 may be graphically represented as a particular slot in a particular equipment rack, as shown in FIG. 5. In certain embodiments, the graphical representation of the data center asset location 550 may be used to facilitate the deployment of a new, or replacement, data center asset 512. In certain embodiments, the new, or replacement, data center asset 512 may be presented as a graphical representation within the UI window 502, as likewise shown in FIG. 5.

In certain embodiments, a data center AR operation may be performed to ensure that a particular data center asset location 550 is available for the deployment of the new, or replacement, data center asset 512. In various embodiments, the data center AR operation may be performed to identify and visualize certain data center asset files 542 associated with the particular data center asset 512. In certain embodiments, such visualizations may be respectively provided in the UI window 502, as described in greater detail herein. In certain embodiments, the UI window 502 may be implemented to allow the data center asset files 542 to be installed on its associated data center asset 512 through a user gesture, such as a drag and drop operation using a cursor 504.

In various embodiments, a data center AR operation may be initiated by a data center system administrator selecting a graphical representation of a particular target data center asset 512 within the UI window 502 through a user gesture, such as a mouse click with a cursor 504. Once the data center system administrator selects the representation of the target data center asset 512, they may then retrieve data center asset files associated with the target data center asset 512. In certain embodiments, the retrieved data center asset files 342 may be stored in a repository of data center asset data. In certain embodiments, a graphical representation of data center asset files 542 stored in the repository of data center asset data 526 may be presented to the data center system administrator within the UI window 502. In certain embodiments, the data center system administrator may select the graphical representation of the data center asset files 342 through a user gesture, described in greater detail herein.

In certain embodiments, the data center system administrator may associate the data center asset files with the target data center asset through a user gesture, such as a drag and drop operation, where a graphical representation of the data center asset files 542 are placed on top of a graphical representation of the target data asset 512. In certain embodiments, the data center system administrator may generate certain data center monitoring and management operation notes. For example, the data center system administrator may enter certain data center asset installation or configuration instructions in the data center monitoring and management operation notes. In certain embodiments, a graphical representation of the center monitoring and management operation notes 544 may be presented within the UI window 502. In certain embodiments, the resulting data center monitoring and management operation notes may then be associated with the target data center asset and its corresponding data center asset files through a user gesture, such as a drag and drop operation, where a graphical representation of the data center monitoring and management operation notes 544 are placed on top of a graphical representation of the target data asset 512.

In certain embodiments, the data center system administrator may then generate a corresponding data center monitoring and management operation work order (not shown) for the target data center asset. In certain embodiments, the resulting data center monitoring and management operation work order may then be assigned to a particular data center technician for execution. In certain embodiments, the data center technician may then receive data center monitoring and management operation work order and accesses the data center monitoring and management console in AR mode. Once in AR mode, the data center technician identifies a graphical representation of the data center asset 512 associated with the data center monitoring and management operation work order they have received.

In certain embodiments, the data center technician may then determine the location 550 of the target data center asset 512 by interacting with its graphical representation within the UI window 502. In certain embodiments, the general location 550 of the target data center asset may initially be graphically indicated within a data center map 546 presented within the UI window 502. In certain embodiments, the data center asset location 550 may be associated with a particular equipment rack and slot within the data center, which may likewise be graphically represented within the UI window 502.

In certain embodiments, once the location 550 of the target data center asset 512 has been determined, the data center technician may access the data center monitoring and management operation notes 544 associated with the target data center asset 512 and read them. In certain embodiments, the data center technician may then retrieve the data center asset files 544 associated with the data center asset. In certain embodiments, the data center technician may use the data center monitoring and management operation notes 544 as a reference in the performance of an associated data center monitoring and management operation. In certain embodiments, the data center technician may access the data center monitoring and management operation notes 544, or retrieve the data center asset files 542, associated with the target data center asset 512 by interacting with its graphical representation within the UI window 502. In certain embodiments, the interaction may be a user gesture, such as a mouse click, finger tap, and so forth.

In various embodiments, the data center technician may apply certain data center asset files 542 to the data center asset 512 through a user gesture, such as a drag and drop operation, where a graphical representation of the data center asset files 542 are placed on top of a graphical representation of the target data asset 512. In certain embodiments, the performance of such a user gesture may result in the initiation of one or more processes associated with applying the data center asset files 542 to the target data center asset 512. In certain embodiments, the data center technician may then update the data center monitoring and management operation notes 544 to reflect the individual operations they may have performed, issues that may have arisen during the performance of those operations, and the operational status of the data center asset 342 once the operations have been completed, or a combination thereof.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
   identifying a data center management task;
   constructing a software file to address the data center management task, the software file being constructed via an augmented reality system;
   virtually providing an indication to install the software file via the augmented reality system; and,
   initiating installation of the software file within the data center via the augmented reality system; and wherein
   the constructing the software file is performed by a system administrator;
   the indication to install the software file is performed by a technician;
   the software file comprises a configuration file; and,
   the configuration file is associated with a particular system within the data center, the particular system being associated with a particular rack and slot within the data center.

2. The method of claim 1, wherein:
   the data center management task comprises at least one of a data center deployment task and a data center remediation data center task.

3. The method of claim 1, wherein:
   the augmented reality system provides a plurality of augmented steps for performing the data center management task.

4. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   identifying a data center management task;
   constructing a software file to address the data center management task, the software file being constructed via an augmented reality system;
   virtually providing an indication to install the software file via the augmented reality system; and,
   initiating installation of the software file within the data center via the augmented reality system; and wherein
   the constructing the software file is performed by a system administrator;
   the indication to install the software file is performed by a technician;
   the software file comprises a configuration file; and,
   the configuration file is associated with a particular system within the data center, the particular system being associated with a particular rack and slot within the data center.

5. The system of claim 4, wherein:
   the data center management task comprises at least one of a data center deployment task and a data center remediation data center task.

6. The system of claim 4, wherein:

the augmented reality system provides a plurality of augmented steps for performing the data center management task.

7. A non-transitory, computer-readable storage medium embodying computer program code, the computer program code comprising computer executable instructions configured for:

identifying a data center management task;

constructing a software file to address the data center management task, the software file being constructed via an augmented reality system;

virtually providing an indication to install the software file via the augmented reality system; and, initiating installation of the software file within the data center via the augmented reality system; and wherein the constructing the software file is performed by a system administrator;

the indication to install the software file is performed by a technician;

the software file comprises a configuration file; and, the configuration file is associated with a particular system within the data center, the particular system being associated with a particular rack and slot within the data center.

8. The non-transitory, computer-readable storage medium of claim 7, wherein:

the data center management task comprises at least one of a data center deployment task and a data center remediation data center task.

9. The non-transitory, computer-readable storage medium of claim 7, wherein:

the augmented reality system provides a plurality of augmented steps for performing the data center management task.

10. The non-transitory, computer-readable storage medium of claim 7, wherein:

the computer executable instructions are deployable to a client system from a server system at a remote location.

11. The non-transitory, computer-readable storage medium of claim 7, wherein:

the computer executable instructions are provided by a service provider to a user on an on-demand basis.

\* \* \* \* \*